US012253900B2

(12) United States Patent
Gerphagnon et al.

(10) Patent No.: US 12,253,900 B2
(45) Date of Patent: Mar. 18, 2025

(54) METHOD FOR OPTIMIZING THE ENERGY CONSUMPTION OF A COMPUTING INFRASTRUCTURE BY SUSPENSION OF JOBS

(71) Applicant: BULL SAS, Les Clayes-sous-Bois (FR)

(72) Inventors: Jean-Olivier Gerphagnon, Les Clayes-sous-Bois (FR); Jean-François Berree, Gieres (FR)

(73) Assignees: BULL SAS, Les Clayes-sous-Bois (FR); LE COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 91 days.

(21) Appl. No.: 18/078,260

(22) Filed: Dec. 9, 2022

(65) Prior Publication Data

US 2023/0185357 A1      Jun. 15, 2023

(30) Foreign Application Priority Data

Dec. 9, 2021   (EP) .................................. 21213553

(51) Int. Cl.
*G06F 1/329*      (2019.01)
(52) U.S. Cl.
CPC .................... *G06F 1/329* (2013.01)
(58) Field of Classification Search
CPC ...................................................... G06F 1/329
(Continued)

(56) References Cited

U.S. PATENT DOCUMENTS 4,412,285 A * 10/1983 Neches .................... H04L 69/00
                                                             719/310
4,975,829 A * 12/1990 Clarey .................... G06F 9/4881
                                                             703/24
(Continued)

FOREIGN PATENT DOCUMENTS

| EP | 3502895 | 6/2019 |
|---|---|---|
| FR | 3010552 | 3/2015 |
| FR | 3031200 | 7/2016 |

OTHER PUBLICATIONS

MPI: A Message-Passing Interface Standard Version 3.1 Jun. 4, 2015 (Year: 2015).*

(Continued)

*Primary Examiner* — Paul R. Myers
(74) *Attorney, Agent, or Firm* — ARC IP Law, PC; Joseph J. Mayo

(57) ABSTRACT

A method for optimizing energy consumption of a computing infrastructure comprising a plurality of compute nodes, each associated with a plurality of jobs. The method includes receiving an energy consumption reduction request comprising an energy consumption reduction objective; determining a set of jobs to be suspended; and sending, to a runtime environment of each compute node associated with a job comprised in the determined set of jobs, a suspension request comprising said job. Upon receiving the suspension request, the method includes suspending the job comprised in the received suspension request, the suspension being carried out via a set of non-native instructions implemented in the runtime environment of each compute node; and active waiting by the suspended job for a suspension stop message comprising said suspended job, the active waiting being carried out via a set of non-native instructions implemented in the runtime environment of each compute node.

10 Claims, 4 Drawing Sheets

(58) Field of Classification Search
USPC .......................................................... 713/323
See application file for complete search history.

(56) References Cited

U.S. PATENT DOCUMENTS

| | | | | |
|---|---|---|---|---|
| 5,546,583 | A * | 8/1996 | Shriver | G06F 9/54 |
| | | | | 719/330 |
| 5,572,680 | A * | 11/1996 | Ikeda | G06F 15/17 |
| | | | | 711/202 |
| 5,671,368 | A * | 9/1997 | Chan | G06F 1/3215 |
| | | | | 713/323 |
| 5,875,320 | A * | 2/1999 | Gu | G06F 1/14 |
| | | | | 713/375 |
| 6,131,166 | A * | 10/2000 | Wong-Insley | G06F 1/3203 |
| | | | | 713/320 |
| 6,457,132 | B1 * | 9/2002 | Borgendale | G06F 1/3246 |
| | | | | 713/320 |
| 6,463,457 | B1 * | 10/2002 | Armentrout | G06F 9/5072 |
| | | | | 709/201 |
| 7,356,677 | B1 * | 4/2008 | Rafizadeh | G06F 9/4418 |
| | | | | 713/1 |
| 2001/0016807 | A1 * | 8/2001 | Hashima | G05B 19/0426 |
| | | | | 703/22 |
| 2001/0044891 | A1 * | 11/2001 | McGrath | G06F 9/30112 |
| | | | | 712/E9.035 |
| 2002/0116085 | A1 * | 8/2002 | Schaaf | G05B 19/41865 |
| | | | | 700/227 |
| 2003/0051183 | A1 * | 3/2003 | Lo | G06F 1/3203 |
| | | | | 713/323 |
| 2007/0079296 | A1 * | 4/2007 | Li | G06F 9/45516 |
| | | | | 717/136 |
| 2009/0094473 | A1 * | 4/2009 | Mizutani | G06F 1/3203 |
| | | | | 713/340 |
| 2009/0172657 | A1 * | 7/2009 | Makelainen | G06F 9/44521 |
| | | | | 717/174 |
| 2009/0265568 | A1 | 10/2009 | Jackson | |
| 2010/0174928 | A1 * | 7/2010 | Borghetti | G06F 9/4893 |
| | | | | 713/320 |
| 2011/0197196 | A1 | 8/2011 | Felton et al. | |
| 2012/0047383 | A1 * | 2/2012 | Laor | G06F 1/3287 |
| | | | | 713/320 |
| 2012/0096287 | A1 * | 4/2012 | Kamath | G06F 1/3203 |
| | | | | 713/300 |
| 2013/0326489 | A1 * | 12/2013 | Eijndhoven | G06F 8/41 |
| | | | | 717/139 |
| 2015/0281336 | A1 * | 10/2015 | Beale | G06F 15/17331 |
| | | | | 709/201 |
| 2016/0179162 | A1 | 6/2016 | Eastep et al. | |
| 2018/0032381 | A1 * | 2/2018 | Ki | G06F 9/3836 |
| 2018/0232036 | A1 * | 8/2018 | Varadarajan | G06F 1/3209 |
| 2018/0233021 | A1 * | 8/2018 | Hiebert | G06F 9/45558 |
| 2019/0155359 | A1 | 5/2019 | Bozga et al. | |
| 2019/0196572 | A1 | 6/2019 | Stoffel et al. | |
| 2021/0342185 | A1 | 11/2021 | Naidu et al. | |
| 2022/0050714 | A1 * | 2/2022 | Grimshaw | G06F 9/4856 |

OTHER PUBLICATIONS

Description of runtime environment (Year: 2015).*
European Search Report issued in EP21213553.7, mailed Jun. 1, 2022 (10 pages).

* cited by examiner

METHOD FOR OPTIMIZING THE ENERGY CONSUMPTION OF A COMPUTING INFRASTRUCTURE BY SUSPENSION OF JOBS

This application claims priority to European Patent Application Number 21213553.7, filed 9 Dec. 2021, the specification of which is hereby incorporated herein by reference.

BACKGROUND OF THE INVENTION

Field of the Invention

The technical field of one or more embodiments of the invention is that of high-performance computers and more particularly that of optimizing the energy consumption of such computers.

One or more embodiments of the invention relate to a method for optimizing the energy consumption of a computing infrastructure, as well as a computing infrastructure, a computer program-product and a recording medium for implementing said optimization method.

Description of the Related Art

A high-performance computer or HPC is a computing infrastructure that makes it possible to simultaneously run a large number of jobs, such as software tasks or distributed calculations, thanks to its large number of physical and logical resources, in particular thanks to its large number of compute nodes. This large number of resources is very energy-consuming, which generates a large carbon footprint.

In order to limit the ecological impact of such infrastructures, HPC solution operators have implemented technologies to optimize the use of HPC resources, in particular in the event of a reduction in power supply. Two approaches are mainly preferred: The first consists of limiting the total number of jobs that can be run at any time or limiting the maximum number of resources that can be allocated; the second consists of limiting the unit consumption of each resource via thresholding mechanisms such as dynamic voltage and frequency scaling (DVFS) operating parameters. These approaches, implemented at the operating system level, do however have several drawbacks, especially because the applications never know the energy consumption reduction request; it is the operating system that will manage the reduction in consumption.

As regards the first approach, imposing a limit on the number of jobs that can be run simultaneously or the number of resources that can be allocated at a given instant causes ongoing jobs to stop if their execution is no longer allowed. This technique therefore guarantees an immediate consumption saving given that the resources are simply idle, or even stopped. However, the time required to stop jobs and the energy consumed as a result is not taken into account.

Indeed, if the jobs to be stopped must be backed up ("checkpointing"), it leads to increased short-term power consumption for the transfer of the data from the jobs to storage spaces. This aspect is all the more detrimental given that certain jobs generate a large amount of temporary data during their execution, which are not usually kept at the end of the job.

Furthermore, in the event that such backup points are not provided when running the job, the whole job is lost when it is stopped. This implies a loss of time and a waste of energy that is all the more expensive when the runtime of certain calculations is long and may have started several hours, days or weeks before they are stopped.

Finally, stopping jobs and/or resources also impacts their recovery. Indeed, the restarting of the jobs and/or of the resources leads to a non-negligible cost and energy cost, to which is added a possible access and reading cost to the data stored at the time of the backup point, a cost for the planning of the jobs and the allocation of the resources, and all the risks of error associated with these various points. It is also possible that the stopped calculations might be stopped again during a new request to reduce energy consumption. This therefore requires algorithms and protocols for allocating resources and managing more complex job stoppages to overcome the possibility of a job becoming stuck in an infinite stop-restart loop.

Another drawback is that this solution, in the case of an electrical shutdown of the resources, also impacts the mean time between failures (MTBF) of the components. Indeed, it turns out that stops and starts of electronic components have a negative impact on their operating state and lead to increasingly frequent faults due to fatigue of these components. Furthermore, these stops and starts have a non-negligible impact on the carbon footprint of HPC installations since the more the MTBF is reduced, the more the carbon footprint of the components increases.

The first approach is therefore very effective for occasionally reducing energy consumption, but is not viable in a long-term perspective for maintaining facilities, planning jobs, or carbon footprint and overall energy consumption, since the immediate energy saving is offset by overconsumption subsequent to the consumption reduction period.

The second approach consists in thresholding the consumption of each resource in order to limit the total consumption of the HPC. This method is effective, but its effects on the running of the jobs are unequally distributed. Indeed, thresholding is most often established statically, that is by imposing a fixed value for the reduction of the consumption in order to remain within a set budget, for example a maximum consumption equal to 70% of the maximum. However, it is not simple to estimate the performance losses of the processors that do not decrease linearly with the reduction in maximum energy available. It is therefore not guaranteed that a 30% decrease in consumption will have only a 30% impact on the job's runtime. Consequently, if the total duration of the job's runtime is considered, the total energy necessary for performing this job will exceed the total consumption of this same job when run by a processor powered at 100% of its capabilities, and this without the user being aware.

Another aspect, related to the previous point, is that it is not easy to optimize the management of the resources and the planning of the jobs by using this thresholding method. Having tailored, suitable optimization would require many parameters to be taken into account that are not usually managed by the planning protocols and make optimization more complex. This aspect is even more detrimental when they continue to operate, as the processes running the applications are unaware of this reduction and therefore of the potential impact on their performance.

Finally, thresholding may prove insufficient. Indeed, it is rarely possible to apply an adaptive reduction to the various resources based on the job they're running. The consumption threshold is generally identical for all the resources. It is not taken into account that certain jobs require less energy to run, or that if some resources are at rest then the others can increase their maximum consumption threshold without exceeding the total consumption limit imposed. In reality, the imposed thresholding is between 50% and 80% of the maximum possible consumption of the resources, but it is rarely lower, which means that the consumption saving is at best on the order of 50% of the maximum consumption.

However, the main advantage of this second approach, in particular compared to the first approach, is that the jobs continue to run despite the reduction in the available energy, and that the physical resources are still operational.

This second approach is therefore less damaging from the perspective of resources in that it does not require the shutdown of the components, and therefore has less impact on the MTBF. On the other hand, the impact of this approach over the duration of the job runtime is not negligible, which can lead to a much higher final energy consumption than without reducing the available energy. Furthermore, having an optimal protocol for planning the jobs and allocating the resources requires many parameters to be taken into account, which complicate the optimization carried out by such a protocol.

There is therefore a need to optimize the energy consumption of a computing infrastructure by limiting as much as possible the increase in the total energy cost of the jobs and without reducing the service life of the components in order to limit the carbon footprint of the HPC.

BRIEF SUMMARY OF THE INVENTION

At least one embodiment of the invention offers a solution to the problems mentioned above, by allowing the implementation of a method for optimizing energy consumption which makes it possible to reduce the energy consumption and carbon impact of a computing infrastructure, without increasing the total individual energy cost of the jobs being run by the computing infrastructure and without causing premature degradation of the components of the computing infrastructure in order to preserve their service life.

At least one embodiment of the invention relates to a method for optimizing the energy consumption of a computing infrastructure comprising a plurality of compute nodes, each compute node being associated with a plurality of jobs being run or waiting to be run on said compute node, the method comprising the following steps:

Receiving an energy consumption reduction request comprising an energy consumption reduction objective;

Determining a set of jobs to be suspended from the plurality of jobs associated with each compute node, the set of jobs being determined based on the received energy consumption reduction objective;

Sending to a runtime environment of each compute node associated with at least one job comprised in the determined set of jobs, a suspension request comprising said job;

Upon receiving a suspension request, suspending the job comprised in the received suspension request, the suspension being carried out via a set of non-native instructions implemented in the runtime environment of the job on each compute node of the computing infrastructure associated with said job;

Active waiting by the suspended job for a suspension stop message comprising said suspended job, the active waiting being carried out via a set of non-native instructions implemented at the job's runtime environment on each compute node of the computing infrastructure associated with said job.

By virtue of one or more embodiments of the invention, the energy consumption of the computing infrastructure is optimized without appreciably increasing the total energy cost of the jobs. Indeed, suspending jobs and placing the compute nodes in an active waiting state makes it possible to achieve energy consumption savings close to that of stopping the jobs and/or compute nodes, except that the suspended jobs can be restarted almost instantaneously at any time, since the compute nodes are not stopped by active waiting. The end of active waiting then makes it possible to remove the suspension of the jobs. There is thus no over-consumption induced by performing or loading a backup point, nor by restarting the compute nodes.

In addition, in at least one embodiment, there is no reduction in performance during the running of the job, since it is not a question of curbing the power/frequency of the compute node running the job. Job runtime is therefore not impacted by a drop in performance of the compute nodes, but only by going into the active waiting state, which de facto increases the time to solution. The method therefore makes it possible to not increase the carbon footprint of the jobs and of the computing infrastructure while handling energy consumption constraints.

In addition, in at least one embodiment, since the compute nodes are not stopped, there is no early damage caused by the method. Thus, the service life of the components is preserved, which makes it possible to limit the carbon footprint of the jobs and the computing infrastructure.

Furthermore, by way of at least one embodiment, jobs on active waiting require little energy to maintain this state, but this is also the case for the processes essential to the operation of the compute node, such as the operating system and the kernels. A compute node can therefore be placed in a minimum operating state without adversely affecting the active waiting or its processes essential to its operation and thus reducing the total consumption of the computing infrastructure.

The advantage of implementing these sets of instructions at the runtime environment level, by way of one or more embodiments, wherein these instructions are not native, which is in particular the case for a runtime environment based on the Message Passing Interface (MPI), is to be able to use these instructions for any application executable on the computing infrastructure. Non-native instructions are understood to mean instructions which do not exist in the runtime environment and which must be specifically implemented in the latter. There is therefore no need to implement these instructions for each of the applications, contrary to the practices previously disclosed in the prior art which are implemented at the operating system level of each node. In addition, by way of at least one embodiment, the application is suspended directly at the application level and not by the operating system, which causes a sudden stop of all the processes of the compute node to which it is associated. The method according to one or more embodiments of the invention is thus achievable independently of the hardware and software specificities of the computing infrastructure and of its nodes, such as the operating system.

Finally, the method according to at least one embodiment of the invention allows a more fine-tuned reduction in consumption. Indeed, as the processing of the suspension is performed at the runtime environment level of each node, and therefore at the applications process level, the suspension can specifically target certain jobs to be suspended while leaving other jobs to run. For example, if two applications are run on the same node, it is possible to suspend only the processes associated with the running of one of the jobs and not those associated with the second job, which is not feasible using existing techniques.

In addition to the features mentioned in the preceding paragraphs, the method according to one or more embodiments of the invention may have one or more complementary features from the following, taken individually or according to all technically possible combinations.

According to at least one embodiment of the invention, the set of instructions is based on the Message Passing Interface standard.

According to at least one embodiment of the invention, each job is represented by one or more processes on one or more compute nodes of the computing infrastructure, and the step of suspending said job is a step of synchronously suspending the process(es) running said job.

One or more embodiments of the invention guarantees that the suspension state will allow these processes to synchronously stop running, without a runtime error.

According to at least one embodiment of the invention, a plurality of jobs distributed across one or more compute nodes is associated with one and the same application, and the step of suspending the method is a step of suspending all the jobs associated with said application.

At least one embodiment of the invention makes it possible to target one or several applications whose jobs, distributed over one or more nodes, are to be suspended. Thus, in one or more embodiments, if a compute node simultaneously runs jobs from two different applications, only the jobs, and related processes, of the targeted applications will be suspended, not all of the jobs and the related processes of said node.

According to at least one embodiment, the method further comprises, upon the runtime environment of the compute node receiving a suspension stop message, a step of stopping the suspension of the job comprised in the received suspension stop message, the suspension stop being performed via a set of non-native instructions implemented at the job's runtime environment on each compute node of the computing infrastructure associated with said job.

At least one embodiment of the invention makes it possible to lift the suspension of the jobs in question upon receipt of a suspension stop message at the runtime environments of the compute nodes in question.

According to at least one embodiment of the invention, the job's suspension stop step is a step of stopping the synchronous suspension of the process(es) running said job.

At least one embodiment of the invention guarantees that the suspension state will allow these processes to synchronously resume running, after the suspension has ended, without a runtime error.

According to at least one embodiment, the energy consumption reduction request further comprises an item of reduction-removal information, the method further comprising a step of sending the suspension stop message to the runtime environment of the job on the corresponding compute node, the sending depending on said item of reduction-removal information.

According to at least one embodiment, the energy consumption reduction request further comprises an item of date and time of reduction information and/or an item of reduction duration information.

By virtue of one or more embodiments, the suspension request can also be carried out at a predefined date and time and/or for a predetermined duration. This also makes it possible to guarantee the synchronicity of the suspension and of the stoppage of the suspension of the jobs and of the related processes in order to allow the processes to resume running without any lack of synchronicity or runtime error.

According to at least one embodiment, each job is associated with at least one item of job information and the set of jobs is further determined based on the job information associated with each job.

One or more embodiments makes it possible to take into account information about the jobs, for example information on a priority order or an estimated energy consumption, to determine which jobs are to be suspended.

At least one embodiment of the invention relates to a computing infrastructure comprising a plurality of compute nodes, each compute node being associated with a plurality of jobs being run or waiting to be run on said compute node, the computing infrastructure comprising:
  A receiving module, configured to receive an energy consumption reduction request comprising an energy consumption reduction objective;
  A processing module, configured to perform the following steps:
    Determining a set of jobs to be suspended from the plurality of jobs associated with each compute node, the set of jobs being determined based on the received energy consumption reduction objective;
    Sending to a runtime environment of each compute node associated with at least one job comprised in the determined set of jobs, a suspension request comprising said job;
Each of the compute nodes is configured to perform the following steps at the runtime environment:
  Upon receipt of a suspension request, suspending the job comprised in the received suspension request;
  Actively waiting for a suspension stop message comprising a suspended job.

At least one embodiment of the invention relates to a computer program product comprising instructions which, when the program is executed on a computer, cause the latter to implement the steps of the method according to the invention.

At least one embodiment of the invention relates to a computer-readable storage medium comprising instructions which, when executed by a computer, cause the latter implement to the steps of the method according to the invention.

One or more embodiments of the invention and its different applications will be better understood upon reading the following description and examining the accompanying figures.

BRIEF DESCRIPTION OF THE DRAWINGS

The figures are presented by way of reference and are in no way limiting to the one or more embodiments of the invention.

DETAILED DESCRIPTION OF THE INVENTION

The method and system according to one or more embodiments of the invention are described below, and the variants associated with reference to the figures. The following description must be considered as illustrative and non-limiting in terms of one or more embodiments of the invention.

Unless otherwise stated, the same element appearing in different figures has the same reference.

At least one embodiment of the invention relates to a method for optimizing the energy consumption of a computing infrastructure. At least one embodiment of the invention also relates to a computing infrastructure for implementing the method according to the invention.

Figure 2:
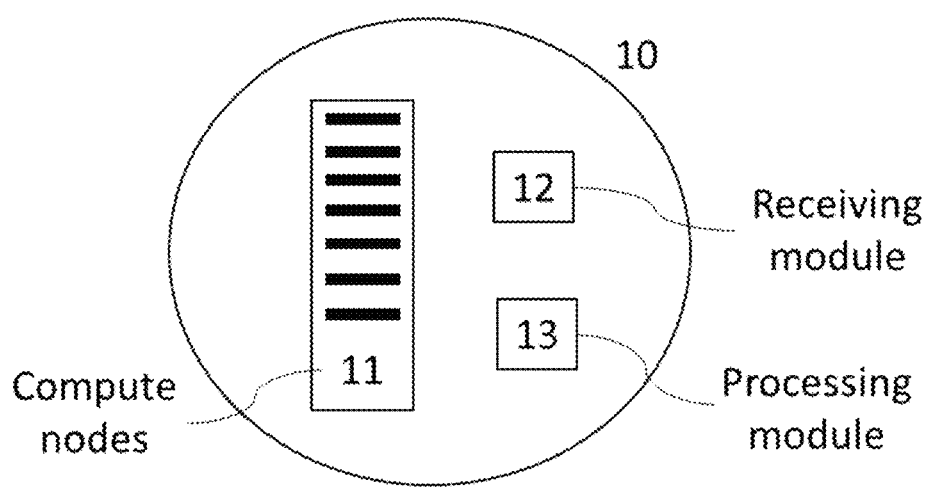
FIG. 2 shows a schematic representation of a computing infrastructure according to one or more embodiments of the invention.

As shown in FIG. 2, by way of one or more embodiments, the computing infrastructure 10 comprises:

A plurality of compute nodes 11;
A receiving module 12;
A processing module 13.

The term compute node is understood to mean any type of device allowing the execution of jobs, for example computing jobs for a finite element simulation.

Each compute node 11 of the plurality of compute nodes 11 is associated with a plurality of jobs being run or waiting to be run on said compute node 11. The jobs waiting to be run are jobs whose execution is scheduled on said compute node 11 after the end of the job(s) being run on said compute node 11 are finished. The jobs waiting to be run are for example placed in a queue on said compute node 11.

The arrangement of the plurality of compute nodes 11 is typically that of a distributed computing environment for the parallelization of jobs.

The receiving module 12 may be any module configured to receive signals. Signals can be composed of one or more data of diverse nature, such as text messages, numerical data or instructions.

The processing module 13 may be any type of module configured to run commands or instructions that are submitted thereto. The processing module 13 has at least one processor and a memory.

Preferentially, the computing infrastructure 10 is a high-performance computer or HPC. The processing module 13 can thus also be the HPC management module that distributes the jobs and allocates the plurality of compute nodes 11 to run the jobs The computing infrastructure 10 may further comprise one or more communicators that allow the plurality of compute nodes 11 to communicate with each other and with the processing module 13. The communicators are not shown in FIG. 2.

Figure 1:
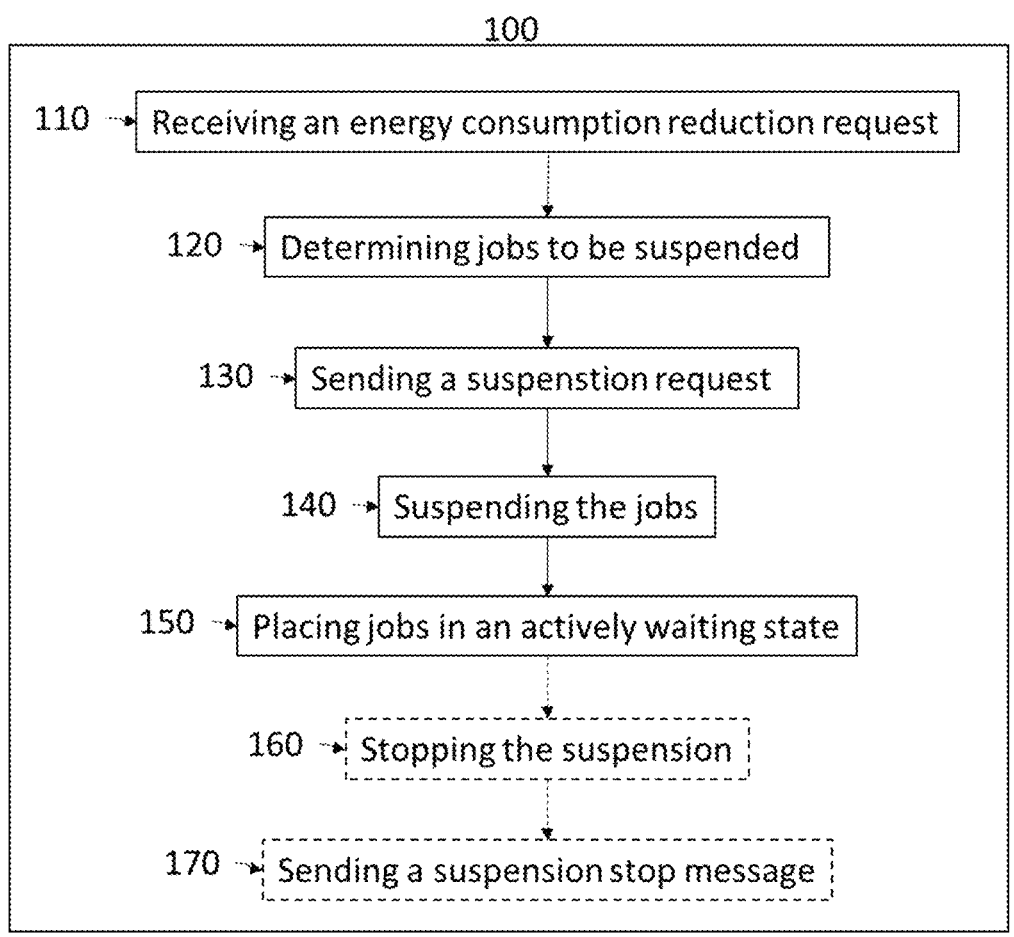
FIG. 1 is a block diagram showing the sequence of steps of a method according to one or more embodiments of the invention.

According to one or more embodiments of the invention, the computing infrastructure 10 is configured to implement the method 100 according to at least one embodiment of the invention illustrated in FIG. 1.

The method 100 according to one or more embodiments of the invention comprises five main steps and two optional steps.

The first step of the method 100 is a step 110 of receiving an energy consumption reduction request.

Step 110 of receiving the reduction request is preferentially performed by the receiving module 13 of the infrastructure 10.

The energy consumption reduction request may be any request concerning a reduction of the energy consumed by the computing infrastructure 10. Preferentially, in at least one embodiment, the energy consumption reduction request is an erasure request concerning the energy consumption of the plurality of compute nodes 11.

The energy consumption reduction request can come from an energy provider, for example in a context of regulating the load of a power grid in order to limit the effects of overloading the grid and possibly outages. The energy consumption reduction request can also come from an energy consumption manager, for example within an enterprise, in order to regulate the energy consumption of the computing facilities to avoid off-peak periods such as weekends and vacations, and peak periods associated with the over- or under-use of computing facilities.

The energy consumption reduction request comprises at least one energy consumption reduction objective.

The energy consumption reduction objective is an objective that the computing infrastructure 10 must achieve in terms of energy consumption in order to satisfy the energy consumption reduction request.

The energy consumption reduction objective may be any type of data indicating an energy consumption reduction objective to be achieved. For example, it may be a value that indicates a reduction in energy consumption proportional to the maximum consumption of the computing infrastructure 10, such as 10% of the maximum consumption of the computing infrastructure 10.

The energy consumption reduction request may also comprise one or more items of date and time information and/or one or more items of duration information.

Based on the energy consumption reduction objective received in step 110, the method 100 according to one or more embodiments makes it possible in a second step 120 to determine a set of jobs to be suspended from among the plurality of jobs associated with each compute node 11 of the computing infrastructure 10.

The set of jobs to be suspended comprises one or more jobs to be suspended. The way in which the set of jobs to be suspended is determined is not limiting in one or more embodiments of the invention, the only constraint being that the suspension of the set of jobs to be suspended makes it possible to achieve the received energy consumption reduction objective. It may be an arbitrary determination of the jobs to be suspended or an optimized determination, for example by relying on an allocation strategy of the compute nodes 11 already known in the prior art. It is possible that each job is associated with at least one item of jobs information and that the determination of all of the jobs to be suspended is dependent on one or more items of job information concerning said jobs. The job information is for example information on the priority level of the jobs or information on the current or estimated consumption of the job.

The determination step 120 is preferentially carried out by the processing module 13.

Preferentially, in at least one embodiment, the processing module 13 defines an allocation strategy for the compute nodes 11 and jobs to be suspended depending on the received energy consumption reduction objective. For example, the receiving module 12 having received an energy consumption reduction request comprising an energy consumption reduction objective of 20% of the energy consumption of the HPC relative to its current consumption, the processing module 13 determines a strategy of ongoing jobs to be suspended in order to reduce the energy consumption of the HPC to a level that meets the energy consumption reduction request.

The third step 130 of the method 100 consists of sending a request to a runtime environment to suspend one or more compute nodes 11. The suspension request indicates that at least one job associated with the receiving compute node 11 is to be suspended.

The suspension request is only sent to the compute nodes 11 associated with at least one job to be suspended, that is at least one job comprised in the set of jobs determined during step 120 of the method 100. The suspension request is therefore customized for each compute node 11 as a function of the job with which it is associated.

The jobs can be grouped under the same application. The suspension request may then relate to one or more applications and be sent to the compute nodes 11 whose jobs are associated with the running of said application. Furthermore, if a compute node 11 simultaneously runs jobs associated with different applications, only the jobs associated with the application concerned by the suspension request are suspended.

On each compute node 11, the jobs can be run by one or more processes. The suspension of said job then involves suspending the process(es) that allow the running of this job. The suspension of these processes is performed synchronously so as to guarantee the synchronization of the running of the processes and to prevent errors in the running of said processes. The synchronization of the suspension of the job processes can be carried out by any synchronization method, for example by defining a time count or a date and time for setting up the suspension.

The sending step 130 is preferentially carried out by the processing module 13.

The sending can be carried out by any emission technique, for example a unicast, multicast or broadcast emission.

The suspension request can be prepared by the processing module 13. The suspension request may also be the product of a calculation performed by the processing module 13.

Preferentially, in at least one embodiment, a suspension request is sent to the runtime environments of a part of the plurality of compute nodes 11 based on the job allocation strategy on the plurality of compute nodes 11.

In the case where the energy consumption reduction request also comprises an item of reduction date and time information, this information can be used to define the date and time at which the suspension request must be sent to the relevant compute nodes 11 of the computing infrastructure 10.

If the energy consumption reduction request further comprises an item of reduction duration information, this information can be used to define the time period during which the reduction of the energy consumption, and therefore the duration during which one or more jobs are to be suspended, must be maintained. This information can also be used to define a maximum duration after which the energy consumption reduction period can be canceled. The suspension request may also be determined based on the reduction duration information.

During step 140 of suspending jobs of the method 100, the runtime environment of each compute node 11 having received a suspension request sent in step 130 relating to one or more jobs, suspends the running of said jobs.

The suspension of the jobs by a compute node 11 is carried out without stopping the processes essential to the good working order of the compute node 11 and without stopping the compute node 11 which is always in the on state.

Preferentially, in at least one embodiment, the suspension step 140 is implemented by virtue of running a set of instructions previously implemented within the runtime environment of each compute node 11 of the computing infrastructure 10. The runtime environment can, by way of example, use the Message Passing Interface (MPI) standard. If so, the suspension is transmitted via instructions for example contained in an MPI_suspend( ) instruction. Since such instructions are not natively known from the MPI standard, they must be previously implemented in the runtime environment of each compute node 11.

Other standards can be used, such as Open Multi-Processing (OpenMP) or Partitioned Global Address Space (PGAS).

Once the job(s) is/are suspended, they are placed, in step 150 of the method 100, in an active waiting state. Each actively waiting job waits for a suspension stop message comprising at least one job suspended in the job suspension step 140.

Preferentially, in at least one embodiment, in the context of an HPC, the active waiting state is obtained by placing each job in question in an active waiting loop until the suspension stop message is received. In other words, the active waiting state is a state wherein the job executes a loop process that will be broken only upon satisfaction of a condition, said condition being the receiving of the suspension stop message.

This active waiting therefore corresponds to a suspension of the progress of the processes related to one or more jobs, which is the equivalent of being idle. It is also possible to reduce the consumption of the compute node 11 using conventional additional mechanisms such as DVFS, for example to reduce the frequency of the central processing unit (CPU) or the graphics processing unit (GPU).

Preferentially, in one or more embodiments, the active waiting step 150 is implemented by virtue of running a set of instructions previously implemented within the runtime environment of each compute node 11 of the computing infrastructure 10. The instructions for active waiting are then contained, for example, in an instruction MPI_wait( ) Since such instruction is not natively known from the MPI standard, it must be previously implemented in the runtime environment of each compute node 11.

It is also possible to place the compute nodes 11, on which the jobs are actively waiting, in a minimum energy consumption state, corresponding to a consumption level strictly sufficient to operate the essential processes of the compute node 11 and to execute the active waiting loop. The minimum level of consumption can for example be achieved by suspending all the processes not essential to the good working order of the compute node 11.

For example, in at least one embodiment, when the compute nodes 11 are in a minimum consumption state, the communicators of the computing infrastructure 10 are kept active to guarantee the transfers of information within the computing infrastructure 10. This makes it possible to avoid having to restart certain compute nodes 11 to reboot the communications of the computing infrastructure 10.

Various mechanisms can be used in order to achieve this minimum level of consumption. For example, in one or more embodiments, it is possible to use conventional mechanisms of the Dynamic Voltage and Frequency Scaling type (DFVS) that make it possible to reduce the energy consumption of a processor to its lowest level without impacting the active waiting loop.

The method 100, by way of at least one embodiment, may further comprise a step 170 of sending a suspension stop message to the runtime environment of one or several compute nodes 11, comprising at least one job whose suspension must be removed.

The method 100, by way of at least one embodiment, may further comprise a step 160 of stopping the suspension of at least one suspended job, by the runtime environment that has received a suspension stop message from each corresponding compute node 11.

Thus, when the runtime environment of a compute node 11 receives a suspension stop message, the corresponding suspended job leaves its active waiting state and resumes its execution. In the case where the compute node 11 had reached a minimum consumption level, the compute node 11 resumes a suitable consumption level without adversely affecting the resumption or running of the job(s).

The suspension stop message can be transmitted based on an item of reduction-removal information. Preferentially, in at least one embodiment, the stop message is generated by the processing module 13 as a function of the item of reduction-removal information. The message can also be transmitted by a third-party module, outside the computing infrastructure 10.

Preferentially, in one or more embodiments, the stoppage of the suspension is implemented by means of a set of instructions implemented in the runtime environment of each compute node 11 of the computing infrastructure 10. In this case, the instructions for stopping the suspension are contained, for example, in an MPI_recovery( ) instruction. Since such an instruction is not natively known from the MPI standard, it must be previously implemented in the runtime environment.

The item of reduction-removal information may be any information relating to the resumption of suspended jobs. For example, it may be a message indicating the end of the suspension request. The item of reduction-removal information may also be an end date and/or time of the energy consumption reduction request that indicates a date and/or time at which the energy consumption reduction request will need to be removed.

The item of reduction-removal information may be contained in the energy consumption reduction request. Among other things, the reduction-removal information may be the duration information contained in the energy consumption reduction request.

The item of reduction-removal information can also be received by the receiving module 12 during the active waiting step 150, and transmitted to the processing module 13 by the receiving module 12.

As a job may be run by one or several processes, stopping the suspension of said job involves stopping the suspension of the process(es) that allow it to be run. The suspension of these processes is stopped synchronously so as to guarantee an error-free resumption of the job at the end of the suspension. The synchronization of the suspension of the job processes can be carried out by any synchronization method, for example by defining a time count or a date and time for setting up the suspension.

Furthermore, in at least one embodiment, it is possible to receive a new energy consumption reduction request during any step of the method 100, containing a new energy consumption reduction objective.

This new energy consumption reduction request may, for example, state that the expected reduction of the energy consumption of the computing infrastructure 10 has been modified to change from a 20% reduction to a 10% reduction compared to the maximum consumption of the computing infrastructure 10. The processing module 13 can then produce a new strategy for allocating the compute nodes 11 and to transmit active waiting stop messages to the runtime environments of certain compute nodes 11 whose jobs are suspended.

Furthermore, in at least one embodiment, this new energy consumption reduction request may for example require a greater reduction in energy consumption. The processing module 13 can then decide to transmit a suspension request to the runtime environments of the compute nodes 11 whose jobs are still running and place certain jobs in the active waiting state.

It is also possible that the energy consumption reduction objective may indicate an extension of the duration of the energy consumption reduction period, for example in the case where a duration of the energy consumption reduction period would have been provided beforehand to the computing infrastructure 10.

Example Embodiments

Figure 3:
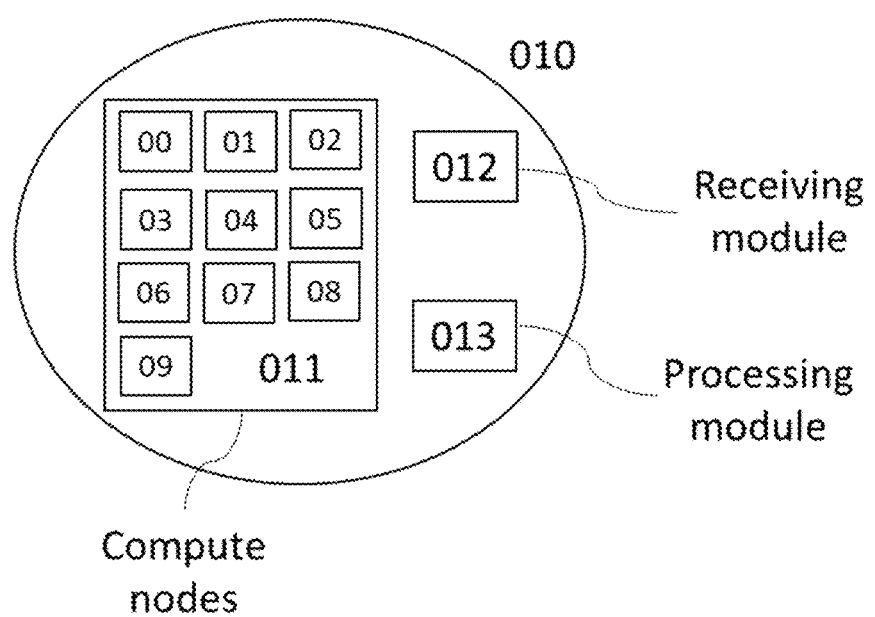
FIG. 3 shows an example of application of the method according to one or more embodiments of the invention on an HPC high-performance computing infrastructure.

Let us consider, as illustrated in FIG. 3 by way of one or more embodiments, a high-performance computer 010 HPC comprising a set 011 of ten compute nodes (numbered from 00 to 09), a resource manager 013, and a reception module 012.

A computing request was received by the HPC 010 for weather forecasts and six nodes 02 to 07 are in the process of running jobs relating to said computing request. Node 01 is running a job corresponding to an earlier computing request. The other two nodes 08 and 09 are unused.

At a time T1, the receiving module 012 of the HPC 010 receives, via its computer drivers, an erasure request indicating an energy consumption reduction objective of 10% of the maximum consumption of the HPC 010, to be maintained up to a date Tf subsequent to T1.

The HPC 010 then executes the method 100 as described above, according to one or more embodiments. The resource manager 013 determines the order of precedence of the current jobs: the calculations for weather forecasts are equivalent in priority to one another. The manager 013 takes into account the fact that the computing of the previous request is reaching its end and that it will not be monopolizing the compute node 01 for much longer. The manager 013 also determines that the current consumption of the weather forecast jobs is similar from one job to another.

The resource manager 013 then determines that suspending some of the jobs in progress for the weather forecasts is sufficient to reduce the energy consumption of the HPC 010 below the energy consumption reduction objective.

The resource manager 013 then sends a suspension request to the runtime environments of the compute nodes 05, 06 and 07 to suspend the ongoing jobs.

The suspension request comprises, for example, instructions whose passing is based on the Message Passing Interface (MPI). The instruction to suspend the ongoing jobs is for example MPI_suspend( ) Since this command is not natively known from the MPI standard, it will have been implemented beforehand at the runtime environment of each compute node. The benefit of implementing this specific instruction at the runtime environment is to be able to use these instructions that the application imports. There is no need to implement these instructions for each of the applications executable by the computing infrastructure 010.

The runtime environments of nodes 05, 06 and 07 thus suspend the running of jobs for calculating weather forecasts and place these jobs in an active waiting state. Active waiting is, for example, carried out by means of an instruction of the MPI_wait( ) type, also contained in the suspension request, and which has been implemented beforehand, since it is not native in the runtime environment under the MPI standard.

The current consumption of the HPC 010 thus satisfies the erasure request received at T1.

At a time T2 subsequent to T1 and prior to Tf, the job on the compute node 01 ends and releases the compute node 01. The resource manager 013 receives information from the compute node 01 about the end of the job. The resource manager 013 then sends a suspension stop message to the runtime environment of the compute node 05, which can then recover the available energy to run its job without exceeding the energy consumption reduction objective imposed by the erasure request.

The suspension stop can, for example, be implemented via an MPI command of the MPI_recovery( ) type, non-native and previously implemented, comprised in the suspension stop message.

The job of the compute node 05 then leaves its active waiting state upon receipt of the instruction from the suspension stop message and continues the running of its job that was suspended.

The consumption of the HPC 010 thus still satisfies the erasure request received at T1.

At a time T3 subsequent to T2 and prior to Tf, the receiving module 012 of the HPC 010 receives a new erasure request indicating an extension of the consumption reduction period to a date Tfp. The new erasure request also states that the energy consumption reduction objective has been modified and is now 20% of the maximum consumption of the HPC 010.

The resource manager 013 produces a new allocation strategy based on this new erasure request. It determines that placing one job in suspension for the ongoing weather forecasts is sufficient to satisfy the new erasure request. It also determines that the calculation of the compute node 05 is for now the most recent instant in the order of execution of ongoing calculations, and that the current calculations on nodes 02 to 04 will be completed before. The resource manager 013 then determines that the job of node 05 must be suspended.

The resource manager 013 sends a suspension request, comprising for example the instructions MPI_suspend( ) and MPI_wait( ) to the runtime environment of compute node 05, and its ongoing job is suspended and placed on active waiting.

The current consumption of the HPC 010 thus satisfies the new erasure request received at T3.

At a time T4 subsequent to T3 and prior to Tfp, the HPC 010 receives an update to the erasure request. This update indicates that the energy consumption reduction objective is now 5% of the maximum consumption of the HPC 010.

The resource manager 013 thus determines that the suspension of nodes 05 and 06 can be removed. The manager 013 then sends the suspension stop message suitable for the runtime environments of compute nodes 05 and 06, comprising for example the instruction MPI_recovery( ) The corresponding jobs leave their active waiting state and resume running without the need to reboot.

At time Tfp, the resource manager 013 sends a suspension stop message to the runtime environment of each of the compute nodes whose jobs are suspended, comprising for example the instruction MPI_recovery( ) In this case, it is compute node 07.

The runtime environment of compute node 07 which receives the suspension stop message takes its job out of the active waiting state and starts running it. The energy consumption reduction period of the HPC 010 is over.

Figure 4:
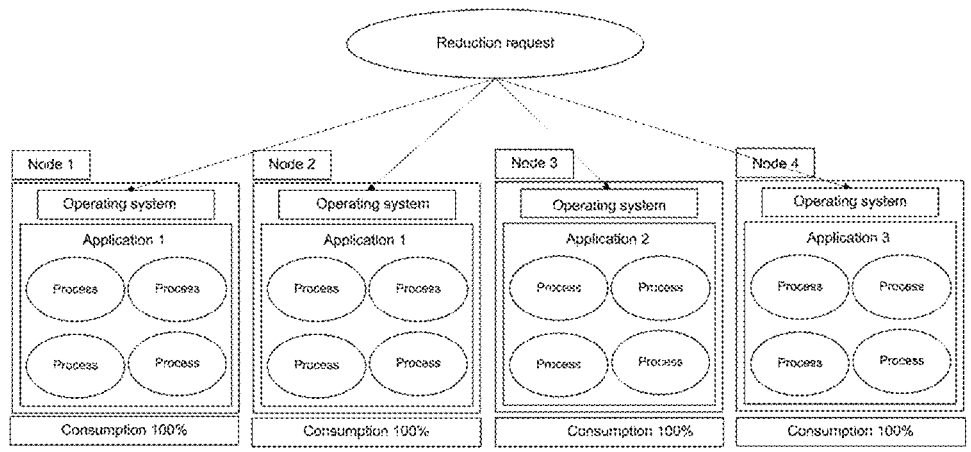
FIG. 4 shows an example of using a method as disclosed by the prior art for reducing the energy consumption of a computing infrastructure.

FIG. 4 shows the conventional operation of a method according to the state of the art for reducing the energy consumption of a computing infrastructure 10. With such a method, the reduction request is received at the operating system of each node, which itself will manage the power supply of the processes and applications to reduce the energy consumption of the computing infrastructure.

Figure 5:
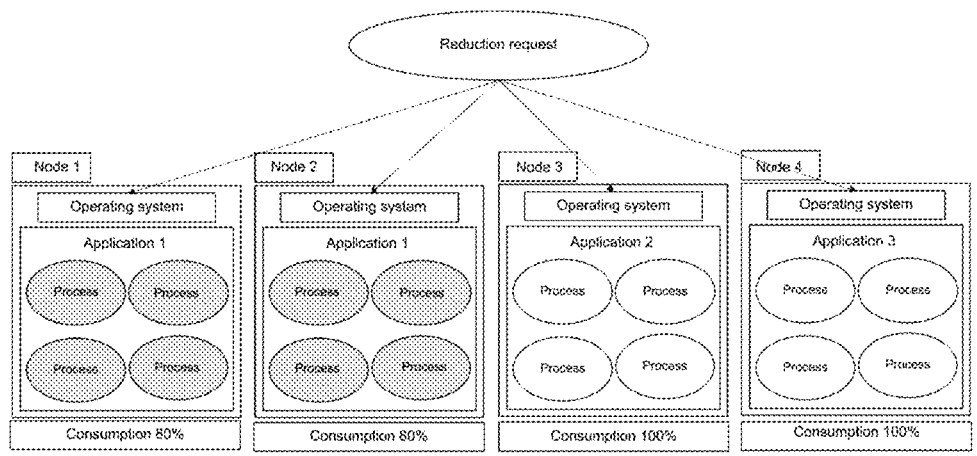
FIG. 5 shows an example of reducing the energy consumption of a computing infrastructure by using a method according to the prior art.

Still according to the prior art, in FIG. 5, the application 1 is targeted by the reduction request. Nodes 1 and 2 affected by the running of application 1 are stopped. The processes associated with this application are also stopped. Nodes 3 and 4, which are not affected by the running of application 1, since they are running jobs related to applications 2 and 3, are not stopped. Thus, the consumption of nodes 1 and 2 has sufficiently reduced to meet the objective of the reduction request, but this will require restarting the nodes and resetting the jobs, with increased total energy consumption. The node processes whose jobs have been stopped are shown in gray.

Figure 6:
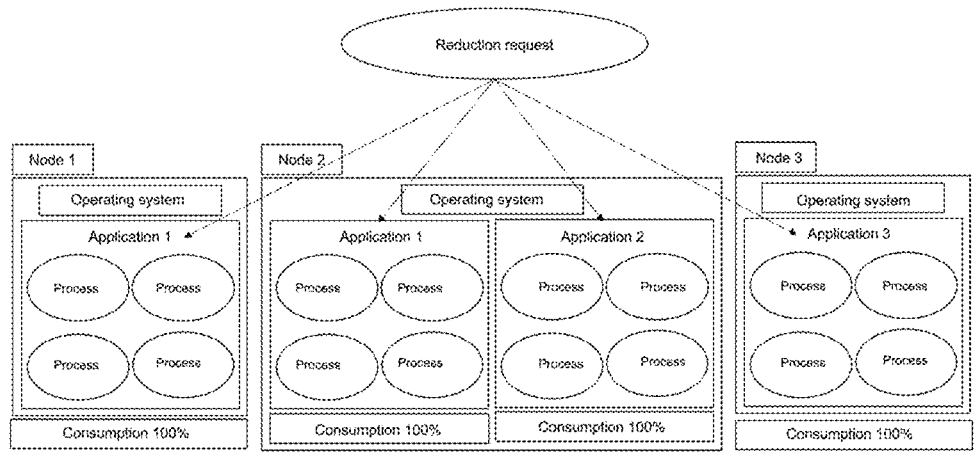
FIG. 6 shows an example of use according to one or more embodiments of the invention as opposed to a method according to the prior art.

In FIG. 6, the energy consumption is regulated by means of the method 100 according to one or more embodiments of the invention. The reduction request results in one or more suspension requests, not shown, which are received not at the operating system level but at the runtime environment, that is, at the application level of the nodes. In the present case, by way of at least one embodiment, node 2 runs one job for application 1 and one job for application 2, each being run by four processes.

Figure 7:
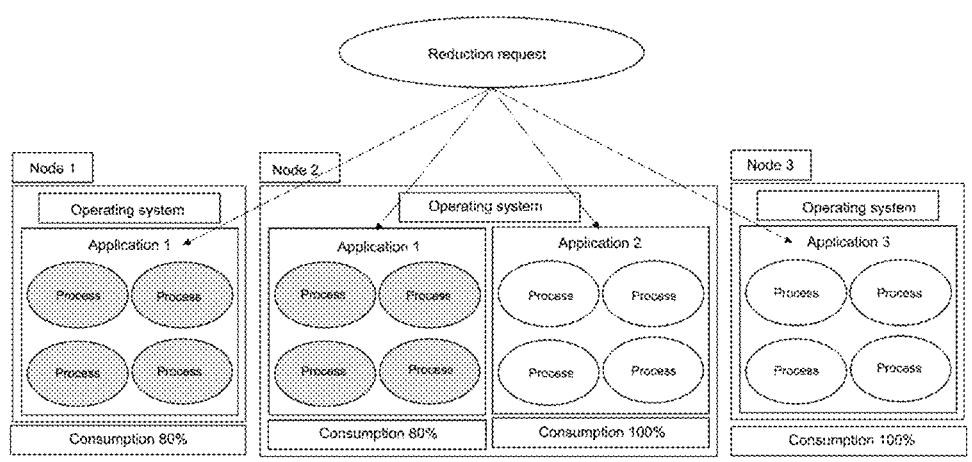
FIG. 7 shows an example of reducing the energy consumption of a computing infrastructure by using the method according to one or more embodiments of the invention.

In FIG. 7, by way of one or more embodiments of the invention, the suspension is then carried out at the runtime environment of nodes 1 and 2, each one running a job associated with application 1, since it is this application that is targeted by the reduction request. The processes running application 1 on nodes 1 and 2 are therefore suspended synchronously by means of a time count started at a fixed date and time. The processes of suspended jobs appear in gray in the figure.

The invention claimed is:

1. A method for optimizing energy consumption of a computing infrastructure comprising an operating system at an operating system level and a plurality of compute nodes, each compute node of the plurality of compute nodes being associated with a plurality of jobs being run or waiting to be run on said each compute node, wherein the method comprises:

receiving an energy consumption reduction request comprising an energy consumption reduction objective;

determining a set of jobs to be suspended from the plurality of jobs associated with said each compute node, the set of jobs being determined based on the energy consumption reduction objective that is received;

sending, to a runtime environment of said each compute node associated with at least one job comprised in the set of jobs that is determined, a suspension request comprising said at least one job;

wherein said runtime environment is at an application level of said each compute node of said plurality of compute nodes;
upon receiving the suspension request, suspending the at least one job comprised in the suspension request that is received, the suspending being carried out via a set of non-native instructions implemented at the runtime environment of the at least one job on said each compute node of the computing infrastructure associated with said at least one job;
wherein said set of non-native instructions are not received by said operating system level of the computing infrastructure, and
wherein said suspending said at least one job is not performed by said operating system;
active waiting by the at least one job that is suspended for a suspension stop message comprising said at least one job that is suspended, the active waiting being carried out via the set of non-native instructions implemented at the runtime environment of the at least one job on said each compute node of the computing infrastructure associated with said at least one job;
wherein said method is performed independent of said operating system.

2. The method according to claim 1, wherein the set of non-native instructions is based on a Message Passing Interface standard.

3. The method according to claim 1, wherein each job of said plurality of jobs is represented by one or more processes on one or more compute nodes of the plurality of compute nodes of the computing infrastructure, and the suspending said at least one job comprises synchronously suspending the one or more processes running said at least one job.

4. The method according to claim 1, wherein said plurality of jobs are distributed across one or more compute nodes and are associated with one and a same application, and the suspending the at least one job comprises suspending all jobs of the plurality of jobs associated with said same application.

5. The method according to claim 1, further comprising, upon the runtime environment of the at least one job of the each compute node receiving the suspension stop message, stopping the suspending of the at least one job comprised in the suspension stop message that is received, the stopping being performed via the set of non-native instructions implemented at the runtime environment of the at least one job on said each compute node of the computing infrastructure associated with said at least one job.

6. The method according to claim 1, wherein the energy consumption reduction request further comprises an item of reduction-removal information, the method further comprising sending the suspension stop message to the runtime environment of the at least one job on the each compute node, the sending depending on said item of reduction-removal information.

7. The method according to claim 1, wherein the energy consumption reduction request further comprises one or more of
reduction date and time information, and
reduction duration information.

8. The method according to claim 1, wherein each job of the plurality of jobs is associated with at least one item of job information, and the set of jobs is further determined based on the job information associated with said each job.

9. A computing infrastructure comprising an operating system at an operating system level and a plurality of compute nodes, each compute node of the plurality of compute nodes being associated with a plurality of jobs being run or waiting to be run on said each compute node, wherein the computing infrastructure comprises:
a receiver configured to receive an energy consumption reduction request comprising an energy consumption reduction objective;
a processor configured to
determine a set of jobs to be suspended from the plurality of jobs associated with said each compute node, the set of jobs being determined based on the energy consumption reduction objective that is received;
send, to a runtime environment of said each compute node associated with at least one job comprised in the set of jobs that is determined, a suspension request comprising said at least one job;
wherein said runtime environment is at an application level of said each compute node of said plurality of compute nodes;
wherein said each computer node of the plurality of compute nodes are configured to, at the runtime environment
upon receipt of the suspension request, suspend the at least one job comprised in the suspension request that is received;
wherein said suspend is carried out via a set of non-native instructions implemented at the runtime environment of the at least one job on said each compute node of the computing infrastructure associated with said at least one job;
wherein said set of non-native instructions are not received by said operating system level of the computing infrastructure, and
wherein said suspending said at least one job is not performed by said operating system;
actively wait for a suspension stop message comprising a suspended job;
wherein said actively waiting is carried out via the set of non-native instructions implemented at the runtime environment of the at least one job on said each compute node of the computing infrastructure associated with said at least one job;
wherein said receive, said determine, said send, said suspend and said actively wait are performed independent of said operating system.

10. A computer program-product comprising instructions that, when executed on a computer, lead the computer to implement a method for optimizing energy consumption of a computing infrastructure comprising an operating system at an operating system level and a plurality of compute nodes, each compute node of the plurality of compute nodes being associated with a plurality of jobs being run or waiting to be run on said each compute node, wherein the method comprises:
receiving an energy consumption reduction request comprising an energy consumption reduction objective;
determining a set of jobs to be suspended from the plurality of jobs associated with said each compute node, the set of jobs being determined based on the energy consumption reduction objective that is received;
sending, to a runtime environment of said each compute node associated with at least one job comprised in the set of jobs that is determined, a suspension request comprising said at least one job;

wherein said runtime environment is at an application level of said each compute node of said plurality of compute nodes;

upon receiving the suspension request, suspending the at least one job comprised in the suspension request that is received, the suspending being carried out via a set of non-native instructions implemented at the runtime environment of the at least one job on said each compute node of the computing infrastructure associated with said at least one job;

wherein said set of non-native instructions are not received by said operating system level of the computing infrastructure, and wherein said suspending said at least one job is not performed by said operating system;

active waiting by the at least one job that is suspended for a suspension stop message comprising said at least one job that is suspended, the active waiting being carried out via the set of non-native instructions implemented at the runtime environment of the at least one job on said each compute node of the computing infrastructure associated with said at least one job;

wherein said method is performed independent of said operating system.

* * * * *